March 10, 1964     L. PÉRAS     3,124,693
ELECTRIC CONTROL DEVICES

Filed Nov. 14, 1960     3 Sheets-Sheet 1

INVENTOR
LUCIEN PÉRAS

By
Stevens, Davis, Miller & Mosher
ATTORNEYS

March 10, 1964

L. PÉRAS 3,124,693

ELECTRIC CONTROL DEVICES

Filed Nov. 14, 1960

INVENTOR
LUCIEN PÉRAS

By Stevens Davis Miller & Mosher
ATTORNEYS

March 10, 1964

L. PÉRAS 3,124,693

ELECTRIC CONTROL DEVICES

Filed Nov. 14, 1960

INVENTOR
LUCIEN PÉRAS

By
Stevens Davis Miller & Mosher
ATTORNEYS

United States Patent Office 3,124,693
Patented Mar. 10, 1964

3,124,693
ELECTRIC CONTROL DEVICES
Lucien Péras, Billancourt, France, assignor to Regie Nationale des Usines Renault, Billancourt, France
Filed Nov. 14, 1960, Ser. No. 69,033
Claims priority, application France Nov. 20, 1959
9 Claims. (Cl. 290—7)

The present invention relates to electric control devices, notably of the type designed for controlling the automatic change from one gear ratio of the gearbox to another gear ratio, the engagement of clutches or other functions on vehicles, with due consideration for the various parameters involved of which a usual and main one is the velocity of rotation of a rotary shaft.

It is known that, as a rule, these devices comprise a source of electric current and that this current is generally a function of the velocity of rotation of said rotary shaft and of control members or units such as electromagnets, relays, solenoid valves or other devices.

The source of control current consists in most instances of a generator or dynamo, or of an alternator, driven by the rotary shaft. The supply of tachometric current, either directly or through relay means, to the control members involves the use of high-quality and costly devices in order to provide the requisite power values, precision and fidelity.

It is the object of the present invention to provide an automatic control device for changing the gear ratio in a gearbox or like transmission mechanism or for gradually engaging a clutch on a vehicle, which is remarkable notably in that the source of control current comprises essentially an alternator associated with a threshold amplifier comprising in turn a Zener diode transmitting only the current peaks corresponding to the crest voltage generated by the alternator, a condenser for integrating these current peaks and at least one transistor or other suitable amplifying member for amplifying the thus integrated current peaks.

The aforesaid threshold device comprises, in addition, at least one diode or other rectifying element of conventional type which in a specific embodiment may consist of a contact device rotating in synchronism with the alternator, this diode being so connected as to eliminate any direct conduction of the Zener diode.

As the threshold amplifier takes the energy necessary for controlling the desired functions from the electrical equipment of the vehicle, it will be possible to use an alternator of moderate power rating and therefore of low cost, and to use control members without any specific properties due to the presence of the threshold whereby large current variations may be obtained with low speed variations, if necessary.

These various and other features, objects and advantages of the present invention will appear more clearly from the following description given with reference to the accompanying drawings illustrating diagrammatically by way of example a few alternate forms of embodiment of the invention and diagrams showing the electrical operating characteristics of the device of this invention.

Figure 1:
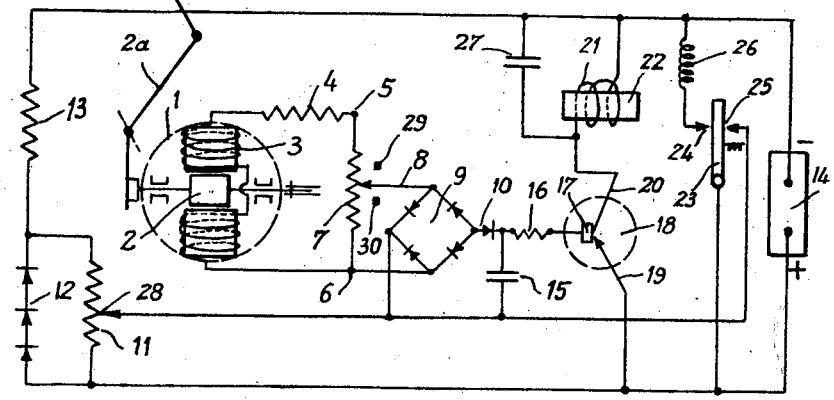
FIGURE 1 is a wiring diagram showing a first form of embodiment of the electronic control device of this invention for automatically controlling the change in the output ratio of the gearbox of a vehicle as a function of the speed thereof and of the engine load, the control members comprising a relay, and the control current amplifier a junction PNP-type transistor.
Figure 9:
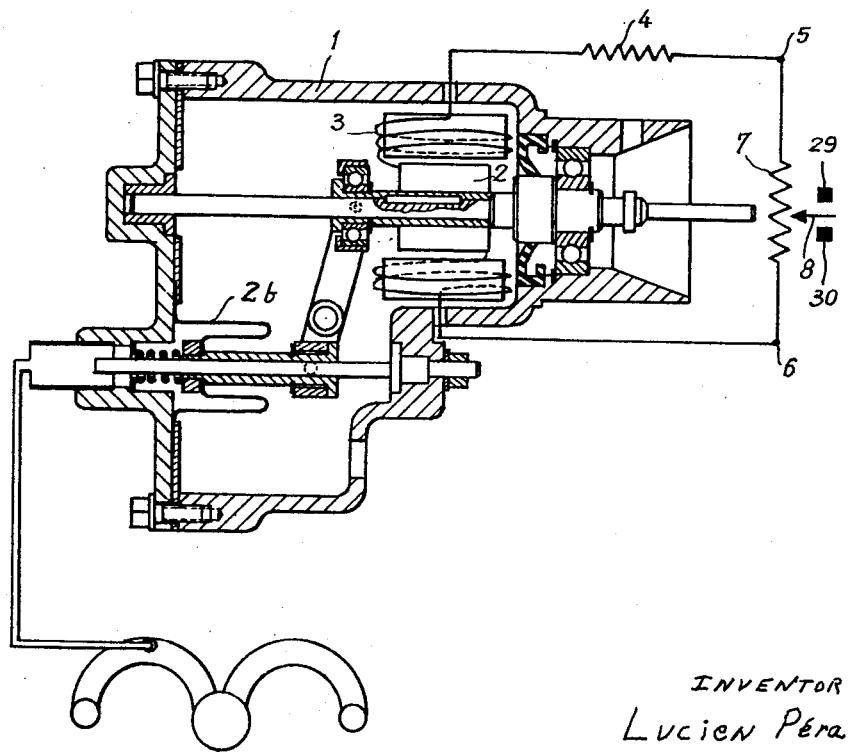
FIGURE 9 is a diagrammatic axial section showing the manner in which the alternator magnet is controlled through the medium of a manometric diaphragm.

Reference will first be made to FIG. 1 in which the circuit illustrated comprises an alternator 1 having a rotary magnet 2 connected to the output shaft of the gearbox or other transmission mechanism of the vehicle; this alternator delivers a voltage increasing with the speed of said shaft. The magnet 2 is displaceable in relation to the winding 3 for example by means of a mechanical control 2a connected to a member movable as a function of the engine load, for example the accelerator as illustrated in FIG. 1, or a manometric control diaphragm 2b responsive to the induction vacuum of the engine (FIG. 9).

The alternator 1 supplies current, for example through the medium of a resistance 4, to the terminals 5 and 6 of a potentiometer 7. Between the slider 8 (of which the travel is limited by a pair of adjustable end stops 29 and 30) and the terminal 6 there is connected one of the diagonals of a diode bridge 9. The other diagonal of this bridge is connected to one terminal of a Zener diode 10 and to the slider 28 of a potentiometer 11. The ends of this potentiometer 11 are connected to the terminals of a voltage stabilizing device consisting of resistance of which the voltage varies non-linearly with the voltage for example from selenium rectifier cells 12 connected in series and fed in the direction of direct conduction through a resistance 13 from the storage battery 14 of the vehicle. The other terminal of this Zener diode is connected on the one hand to a high-value condenser 15 having its other terminal connected to the slider 28 of potentiometer 11 and, on the other hand, to the base electrode 17 of a junction PNP-type transistor 18 through a non-linear resistance 16.

The control members proper comprise an electromagnetic relay 21 and, for example, a hydraulic solenoid valve of which only the control winding is illustrated at 26. The coil 21 of relay 22 may be fed with current from the storage battery 14 through the emitter electrode 19 and the collector electrode 20 of transistor 18. The blade 23 of relay 22, when the coil 21 is deenergized, bears on the back contact 25, but when the coil 21 is energized it engages the front contact 24 to connect the storage battery 14 with the winding 26 controlling the gear change. If desired a condenser 27 may be connected across the terminals of coil 22.

Figure 8:
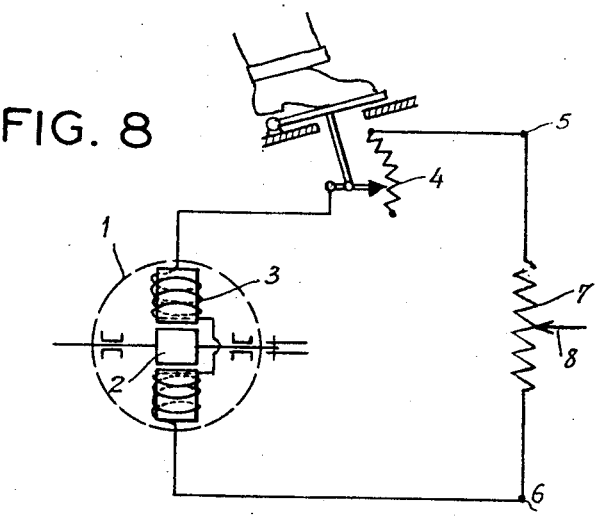
FIGURE 8 is a diagram showing the use of the accelerator pedal for controlling the flux variation.

The circuit described hereinabove operates as follows:

The alternator 1 delivers a crest voltage proportionate with the speed of the vehicle and adapted furthermore to vary:

(a) Through a mechanical action exerted on the flux (for example through the medium of the mechanism 2a described hereinabove) or through an action exerted on the variable resistance 4. These actions are exerted automatically and their purpose is to take due account of the parameters characterizing the operation of the vehicle, such as the engine load, etc. The mechanism (see FIG. 8) for varying the resistance 4 as a function of these parameters will not be described in detail, as its practical embodiment is well known to anybody conversant with the art.

(b) Through the action exerted on the potentiometer 7 by means of control members (not shown) actuated by the driver of the vehicle.

When the crest voltage between points 6 and 7 exceeds the threshold defined by the assembly consisting of the diode bridge 9 and the Zener diode 10, the current peaks transmitted from this assembly charge the condenser 15. As this condenser acts as a circuit integrating these current peaks, it will discharge itself directly through the non-linear resistance 16. The transistor 18 will thus amplify the current fed to its input side and transmit same to the winding 21. When the current flowing through this winding attains a sufficient value the blade 23 is attracted and the contact 23—25 is broken. According to a specific feature of this invention, this contact-opening action is attended by the production of a regulated current between the slider 28 and the positive terminal of the storage battery 14 of the vehicle. This voltage supply increases the potentiometer difference existing between the base electrode and the emitter electrode of transistor 18, thus accelerating the end of the travel accomplished by the blade 23. Upon completion of its movement this blade 23 will connect the load winding 26 to the storage battery 14. The condenser 27 will reduce the relay vibration, if any, and protect the transistor against accidental current breaks.

When the velocity of rotation of the alternator 1 decreases, at a given value the effect of the alternator voltage peak (plus the effect of the aforesaid regulated voltage) is no longer sufficient to keep the relay 22 closed. Then the blade 23 leaves its front contact 24 to deenergize the load winding 26, and reengages the back contact 25.

As the current $I_2$ (see FIG. 3) controlling the relay is higher than the opening current $I_1$, the velocity $V_2$ of the alternator at which the blade is caused to close (changing to a higher ratio) would be higher than the speed $V_1$ at which the blade is released (changing down to a lower ratio). But the difference $V_2-V_1$ is increased since the "opening" velocity results from the conjugate effect of the alternator crest voltage and of said regulated voltage, whereas the "closing" velocity results only from the crest voltage of the alternator.

As a result, the margin between the speed $V_2$ corresponding to the blade sticking and the speed $V_1$ corresponding to the blade opening can be adjusted through the adjustment of slider 28. This margin is the so-called "stability" margin and the corresponding voltage is the so-called "stability" voltage for it avoids the undesired "hunting" of the mechanism.

On the other hand it will be noted that the adjustment of the slider 28 by the driver of the vehicle enables him to shift at will the assembly of both change levels $V_1$ and $V_2$ towards lower or higher speeds.

The stops 29 and 30 are pre-adjusted at the works and their purpose is to limit the range of adjustments which the driver may accomplish, in order to take due consideration for the rated tolerances concerning the reference voltage of the Zener diode.

Figure 3:
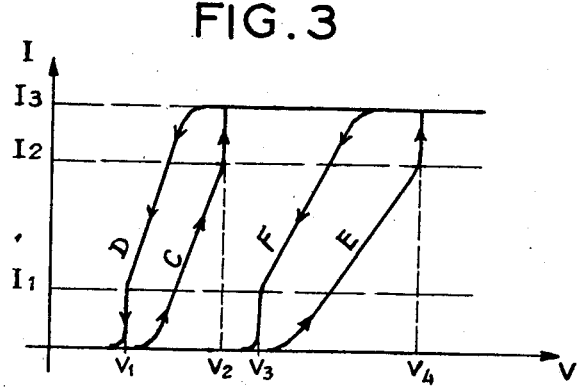
FIGURE 3 is another diagram plotting the variation in the output current of the amplifier of FIG. 1 as a function of the velocity of rotation of the shaft connected to the alternator for two different values of the engine load parameter.

The manner in which the various adjustments of the points of passage from one ratio to another take place will be better understood if reference is made to FIG. 3 illustrating diagrammatically the current I circulating through the winding 21 of the relay as a function of the velocity V of the alternator.

In practice, the points at which these changes take place are adjusted as a function of the following conditions:

When the engine load is relatively moderate (the driver's foot has released the accelerator pedal) it is desirable that the velocities $V_1$ and $V_2$ causing the gear changes be relatively low. Then the alternator delivers its maximum flux (due to the action exerted by the mechanism 2a), in a position consisting on the other hand a mechanical return position, to deliver the maximum voltage output. The current variation I is then the variation illustrated by the curve C for increasing speeds, and by the curve D for decreasing speeds. It will be seen that these curves define the change-speed velocities $V_1$ and $V_2$ corresponding to a low engine speed.

On the other hand, when the engine is loaded (fully depressed accelerater pedal) it is desirable, in order to obtain the best possible efficiency therefrom, to change the gear ratio at a high engine speed. This result is obtained automatically by properly displacing the magnet 2 of the alternator in order to utilize only one fraction of the flux, and in this case the voltage delivered by the alternator will be reduced.

Under these conditions, in the case of increasing speeds the variation of I will be that illustrated by the curve E, and, in the case of decreasing speeds, that illustrated by the curve F.

These curves define the gear change speeds $V_3$ and $V_4$ with fully depressed accelerator pedal, which correspond to a high engine speed.

Between these extreme points of the "free pedal" and "depressed pedal" gear changes, a proper arrangement of the pole pieces of the alternator, their length, the lever arms, and the elasticity introduced in the linkage 2a, will provide practically all the forms of action of the load factor. Notably, it is desirable to prevent the load factor from being effective at the beginning of the stroke of the accelerator pedal in order to avoid ill-timed gear changes from an upper ratio to a lower ratio. This result may be obtained for example by using a magnet 2 shorter or longer than the magnetic circuit 3.

The device of this invention may be provided with means adapted, when the accelerator pedal is depressed beyond the full-throttle position to either shift the whole of the gear-change points toward the high speed ranges by altering the alternator voltage, or to reduce the interval between the "upward gear change" and the "downward gear change" by short-circuiting under the same conditions the slider 28 and the plus terminal of the storage battery 14, thus eliminating the stability voltage; alternately, a combination of these two arrangements may be resorted to.

It may be observed that the value of resistances 4 and 7 should be relatively low. In fact, as these resistances add themselves to the inner resistance of the alternator and of the Zener diode, they might reduce the control current corresponding to a predetermined overstepping of the threshold speed. This might interfere with the rapidity of the control action, which is an important factor in the case of a change-speed control device and which is influenced in a favorable manner, according to this invention, by the use of a Zener diode, as this device is characterized by a very low internal resistance beyond its threshold of operation.

Now the function of the non-linear resistance 16, of which the use constitutes another feature of this invention, will be explained with specific reference to FIGS. 1 and 2.

When the current flowing through the winding 21 of relay 22 attains its saturation value, and as the alternator speed is then higher than the gear-change speed, it is useless to allow the current flowing through the base electrode 17, the Zener diode 10 and the diode bridge 9 to increase with speed. This is prevented by using the device of FIG. 1 incorporating a resistance 16 of which the value increases with the current flowing therethrough; for example, this resistance may consist of a metal filament mounted in a vacuumized enclosure or in a gas-filled enclosure.

Figure 2:
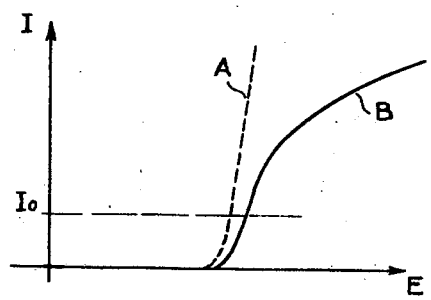
FIGURE 2 is a diagram plotting the variation in the average current at the input of the amplifier of FIG. 1 as a function of the crest voltage of the alternator.

FIGURE 2 affords a better understanding of this control current limitation obtained by the use of resistance 16. The curve A shows the variations in the current I circulating through the Zener diode 10, the diode bridge 9 and the base electrode 17 of transistor 18 as a function of the peak voltage E of alternator 1, it being assumed that the input resistance of the amplifier is zero, this resistance actually consisting of resistance 16 plus the equivalent basic resistance of transistor 18.

The curve B shows the pattern of the aforesaid variations under actual operating conditions. Under the value $I_0$ at which the relay 22 is caused to close, it will be seen that the slope of the curve is only slightly reduced by the presence of the non-linear resistance 16, whilst beyond the sticking point the current in the base 17 is efficiently limited.

Outside the advantages already set forth (possibility of obtaining with relatively simple means a very rapid servo control action responsive to the different parameters inherent to the vehicle or adjustable under the driver's control) the device of this invention is characterized by other features, such as a great accuracy in the threshold adjustment (the Zener diode, due to its current/voltage characteristic, and also because it transmits intense current peaks, constitutes a very accurate reference totally independent of the output voltage of the storage battery), the possibility of effecting a satisfactory temperature compensation, etc.

In connection with temperature compensation, it may be pointed out that this is facilitated by the fact that certain Zener diodes have a coefficient of temperature of a sign opposite to that of transistors and of conventional diodes consisting of semi-conductors.

In certain cases it will be interesting to place the diode bridge 9 within the enclosure of alternator 1 in order to compensate the temperature coefficient of magnet 2. In fact, the waste voltage lost through the rectification in the diode bridge decreases with the temperature; therefore, it may wholly or partly compensate the loss of magnetization of the magnet 2 when the temperature increases and approaches the Curie point, if the diodes and the magnets have the same temperature. The variation in the resistance of the winding 3 may be compensated at the same time. Of course, the mounting shown in FIG. 1 may be embodied with many modifications without departing from the spirit and scope of the invention.

Thus, notably, other solid amplifying members or a magnetic amplifier or other means may be substituted for the transistor.

On the other hand, the mounting shown in FIG. 1 may be simplified by replacing the diode bridge 9 with a single diode connected between the slider 8 and the Zener diode 10, the terminal 6 of potentiometer 7 being connected directly to the slider 28 of potentiometer 11 instead of the diode bridge. In this alternate embodiment the variation in current in the relay as a function of the alternator speed is obviously not so swift as in the form shown in FIG. 1, for the control circuit operating time is divided into two halves. One may also use an alternator 1 comprising a winding 3 having a central point, whether real or artificial and use a two-diode two-way rectifier with the same advantages as with the four-diode bridge 9 and a winding without central point.

The stability may also be obtained by short-circuiting the resistance 4 by means of a contact actuated by the relay in its energized condition. This solution is advantageous in that it increases the voltage available from the alternator and therefore permits of dispensing with the use (proposed in FIG. 1) of an auxiliary direct-current voltage to be regulated in order to add its effect to that of the alternator voltage.

In general, the anomalous displacement current from the transistor (i.e. the current issuing from the transistor in the absence of control current peaks) is not detrimental, even when the temperature rises, for the relay may be so dimensioned that its opening current be higher than the maximum value of said displacement current.

Figure 4:
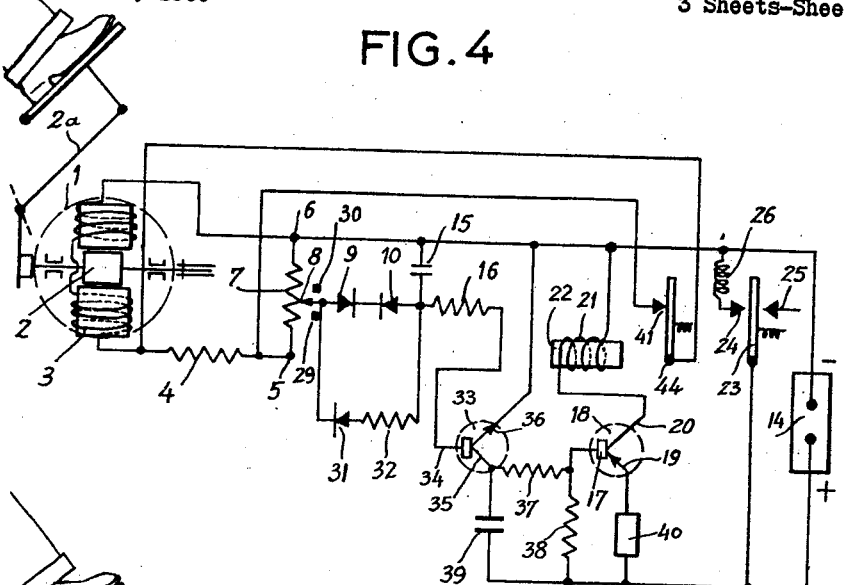
FIGURE 4 is a modified embodiment of the circuit illustrated in FIG. 1 wherein the control current is amplified by means of two series-connected transistors.

However, in case of need a counter-diode device or a device incorporating stabilizing resistances of the type illustrated in FIG. 4 may be included in the mounting of FIG. 1.

Furthermore, it may be pointed out that if it is not possible to control the alternator mechanically by means of the accelerator pedal, a non-shift circuit alternator may be used and the load and/or other parameters will be caused to act only upon the variable resistance 4.

FIG. 4 illustrates a modified embodiment of the circuit of FIG. 1, which comprises an amplifier incorporating two transistors of the NPN and PNP types respectively, and a single diode in series with the Zener diode. On the other hand, the device of FIG. 4 comprises an original device for ensuring the stability of the special members provided for ensuring its proper operation at relatively high temperatures, in spite of the inconveniences resulting from the increase in the inherent conductivity of the semi-conductors when the temperature increases.

In FIG. 4 the same reference numerals designate the corresponding elements of FIG. 1. However, the slider 8 is shown as being connected to the condenser 15 through two parallel circuits: the first circuit consists of a conventional diode 9 disposed in the positive direction and of a Zener diode 10, and the other circuit comprises a diode 31 disposed in the direction opposite to that of the diode 9 and of a resistance 32. The impedance of line 31, 32 is higher than that of line 9, 10 taken beyond the threshold. These two circuits have their common output point connected through a non-linear resistance 16 to the base electrode 34 of a transistor 33 of NPN polarity and of which the emitter electrode 36 is connected to the negative terminal of the storage battery 14, the collector electrode 35 of this transistor being connected through a resistor 37 (intended for limiting current dissipation) to the base electrode 17 of the transistor 18 having a PNP polarity.

From the positive terminal of the battery the arrangement comprises:

A filter condenser 39 leading to the collector electrode 35;
A potential-stabilizing resistance 38 leading to the base electrode 17;
An element having a non-linear resistance 40 decreasing with the voltage which leads to the emitter electrode 19 and consisting for example of a semi-conductor diode, silicon carbide, etc.;
And, finally, a direct connection leading to the blade 23 of a relay 22 of which the winding 21 receives the current flowing from collector electrode 20 of transistor 18.

The blade 23 normally engaging the back contact 25 engages the front contact 24 when the relay is energized, thus causing the operating voltage to flow through the load winding 26.

The relay 22 comprises another blade 44 adapted in the operative or energized condition of the relay to short circuit the resistance 4 through a fixed contact 41.

Now the mode of operation of the device shown in FIG. 4 will be described, reference being briefly made to the elements corresponding to the similar elements of FIG. 1.

The crest voltage of the alternator which, as already explained, is corrected by the action of the load factor, of resistance 4 and of potentiometer 7, will cause current peaks to appear when the crest voltage is higher than the threshold voltage of the assembly consisting of the diode 9 and Zener diode 10, these current peaks being integrated by the condenser 15 and fed to the base circuit 34 of transistor 33. The emitter-collector current of transistor 33 will flow almost completely through the junction 17—19 of transistor 18 and causes the collector electrode 20 to deliver current in turn. As a result, a current circulates in the winding 21 of relay 22. If the crest voltage of the alternator exceeds sufficiently the threshold value of the Zener diode 10, the current flowing through the coil 21 may be sufficient to cause on the one hand the blade 44 to engage its front contact and thus short circuit through contact 41 the resistance 4, in order to increase the alternator voltage available between the slider 8 and the end terminal 6 of the potentiometer (stability device) and, on the other hand, to cause the blade 23 to similarly engage its front contact, thus energizing the load winding 26.

According to a specific feature of the circuit illustrated in FIG. 4, when the voltage generated by the alternator is not sufficient to permit the passage of current through the Zener diode, the diode 31 disposed in the direction opposite to that of the conventional diode 9 introduces through resistances 32 and 16 a blocking bias in the base circuit of transistor 33, thus reducing the anomalous displacement current likely to appear at relatively high temperatures. When the current begins to flow through the Zener diode, the internal resistance of circuit 9, 10 is so low that in this case the output of diode 31 and resistance 32 may be disregarded. The passage points are thus only slightly altered by the presence of this auxiliary circuit 31—32.

The element 40 of which the resistance decreases with the voltage (which element may consist for example of a diode having a low coefficient of temperature which is disposed in the positive direction) permits of reducing the residual current of transistor 18, the potential of base 17 being determined by the resistance 38. In fact, by properly selecting the value of this resistance, the generation of a current in the emitter electrode 19 will produce a voltage drop across the terminals of element 40, thus biasing the junction 17—19 in the non-conducting direction.

This arrangement constitutes an improvement over that consisting in feeding the emitter electrode 19 through a voltage divider connected across the plus and minus terminals of the storage battery 14, this voltage divider causing either an abnormal current consumption or a degenerative feedback.

The mounting illustrated in FIG. 4 is advantageous due to the two-stage amplification in case the relay 22 absorbed abnormally high current values. On the other hand, if the device is to operate at temperature exceeding 60° C. with semi-conductors such as germanium or the like, the compensation devices incorporated in this circuit will prove particularly efficient.

Figure 5:
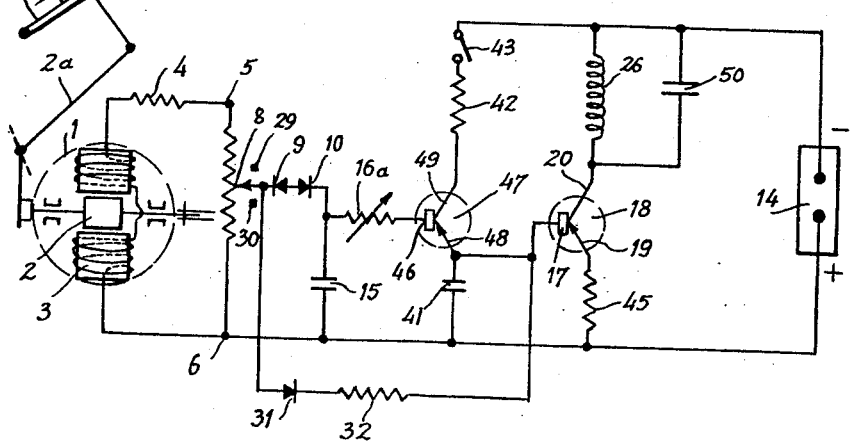
FIGURE 5 is another wiring diagram showing a control arrangement for gradually engaging electric clutches, notably clutches for starting vehicles from rest.

FIG. 5 illustrates another type of application of the device of this invention. The circuit of FIG. 5 is intended for supplying current increasing gradually between two limits, with the alternator speed, to a load member which may consist for example of an electrical clutch for starting a vehicle from rest.

In a device of this character the alternator is generally connected to the engine so as to obtain an operation somewhat similar to that of centrifugal starting clutches. However, the device thus obtained will be more advantageous than known arrangements of this character in that it can be disengaged by means of simple electrical control means.

In FIG. 5, the same reference numerals designate members similar to the corresponding members of FIGS. 1 and 4.

The assembly comprising the conventional diode 9 and the Zener diode 10 feeds—beyond the threshold—the base circuit 46 of a transistor 47 of the PNP type through the variable resistance 16a, after the current peaks have been integrated in the condenser 15.

The emitter 48 of transistor 47 is connected to the base 17 of transistor 18, and its collector electrode 49 is connected to the negative terminal of the storage battery through a resistance 42 and a switch 43. The purpose of this switch 43 is to break, and restore at will the current in the load winding 26.

Therefore, the transistor 47 is used as a current amplifier.

A filter condenser 41 is connected between the base 17 and the positive terminal of the storage battery.

The emitter electrode 19 of transistor 18 is connected through a resistance 45 to the positive terminal of the storage battery, and the collector electrode 20 is connected to the negative terminal through the load winding 26. Connected across the terminals of this winding is a filter condenser 50 to protect the winding against break impulses. A diode 31 connected in the opposite direction with respect to the diode 9 connects the slider 8 to the base 17 and condenser 41 through the medium of a high-value resistance 32.

The operation of the circuit illustrated in FIG. 5 will now be described briefly, due to the analogies of this circuit with the former ones.

When the crest voltage of alternator 1 exceeds the threshold resulting from the Zener diode voltage and the waste voltages from the various electrodes connected in series, a base current appears in transistor 47, and therefore an amplified current circulates in turn in the junction 17—19. This last-mentioned current causes a current increasing gradually with the alternator velocity to appear in the load winding 26, between two limits: a lower limit at which current appears in the winding 26 is determined by the threshold level, and an upper limit determined by the value of the resistances in the control circuit; one of these resistances i.e. resistance 16a, is adjustable; another resistance consists of the degenerative-feedback resistance 45.

The member provided for adjusting the resistance 16 is connected for example to the accelerator pedal of the vehicle or to a vacuum line or any suitable control means of this character. The resistance 45 is adapted to change both the slope of the curve representing the current variation in the load winding as a function of the alternator speed, and the maximum current value. Thus, a clutch of which the engagement speeds and the smoothness of operation depend on the engine load, for example as a function of the throttle opening, may be obtained. However, it is preferable to act on resistance 16 than on resistance 45 and in most cases the latter may be dispensed with. In fact, the presence of a high resistance 16 will shift the maximum current point toward the high speed range without however altering the strength of this maximum current; besides, the resistance 45 will not be so effective.

The purpose of resistance 42 is essentially to limit the dissipation from the collector electrode of transistor 47. When the switch 43 is opened it causes the current to vanish from the load winding 26, thus permitting a clutch release even at high speed.

The condenser 41 introduces a time constant which increases the smoothness of the clutch reengagement.

A gradual action in the re-acceleration is obtained due to the resistance 45 possessing a relatively high value when the throttle is closed.

This device may be combined with those described in U.S. application No. 820,462, filed by the applicant on June 15, 1959, and entitled "Device for Gradually Producing an Electrical Current, Notably for Electromagnetic clutches."

The device comprising the diode 31 and resistance 32 which will be designated hereinafter by the expression "reverse diode" makes it possible to reduce the follow current of transistor 18. It may be reminded that, in a mounting of this character, follow current values must be kept within very low limits due to the remanent magnetism of the load members.

A relay or a transistorized multivibrator may be disposed either across the terminals of member 26 or as a substitute for resistance 42 in order to differentiate the operation at increasing speed from the operation at decreasing speed by introducing an auxiliary voltage as in the stability device of FIG. 1 or by modifying the voltage generated by the alternator as in the case of FIG. 4. This arrangement may be advantageous for improving the use of the engine for braking purposes.

As an alternative to the embodiment shown in FIG. 5, the base 17 and condenser 41 may be connected to the collector electrode 49, and the emitter electrode 48 may be connected directly to the positive terminal of the storage battery 14.

Thus, a current decreasing as the alternator speed increases would thus be obtained in the load member. In this case, which could be interesting for certain applications, it would be advisable—in general—to connect the resistance 32 not to the base 17 of transistor 18, as in the case illustrated in FIG. 5, but to the base 46 of transistor 47.

Figure 6:
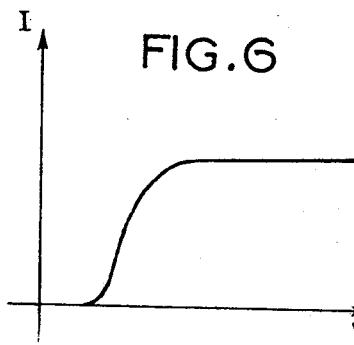
FIGURES 6 and 7 are diagrams plotting the current variation as a function of the alternator speed in the circuit of FIG. 4, for two different values of auxiliary parameters.

FIG. 6 illustrates the current variation occurring in the load winding 26 as a function of the alternator speed for a given adjustment of the slider of potentiometer 7 and of the variable resistance 16, which adjustment produces a rapid variation and a low threshold. By way of example, this adjustment corresponds to a "light-footed" starting in the case of a starting clutch.

Figure 7:
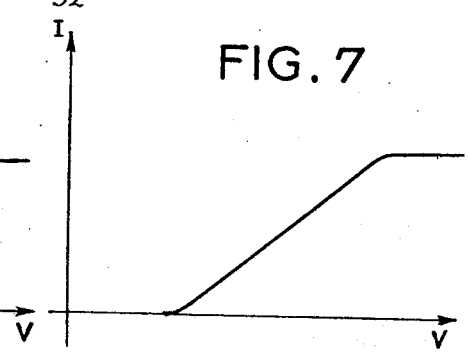

FIG. 7 corresponds to another adjustment giving a slow variation and a higher threshold corresponding for example to a starting with "fully depressed pedal."

By using non-linear resistance having an adequate low of variation, notably for resistance 16a, 42 and 45, it will be possible to obtain current variation patterns as close as possible to those desired for each specific case.

Of course, the form of embodiment illustrated in FIGS. 1, 4 and 5 should not be considered as limiting the present invention as many other embodiments and applications of the electric control device of this invention may be contemplated without departing from the basic principles thereof as set forth in the appended claims.

I claim:

1. A device for use in a vehicle to control elements such as speed gear boxes, clutch engagement means, and the like, as a function of various parameters of which at least one is the velocity of rotation of a rotary shaft, comprising in combination a rotary shaft of the vehicle, an alternating current generator drivingly connected to said shaft and having an output crest voltage which is a function of the velocity of said shaft, a potentiometer connected across the output of said generator and having an adjustable contact, rectifier circuit means connected between the adjustable contact and one terminal of said potentiometer, said rectifier circuit means including at least one Zener diode which transmits only current peaks corresponding to the crest voltage generated by the generator, a condenser connected to said rectifier means to integrate said current peaks and to develop a resultant crest voltage thereacross, a transistor, means to apply said resultant crest voltage to the base of the transistor, a battery, a relay, means connecting the emitter and collector of the transistor to the terminals of said battery through the winding of said relay, said relay having a pair of contacts closing responsive to energization of the relay, and a control element having an energizing circuit including said contacts, whereby said control element can become energized when the velocity of the shaft exceeds a predetermined value.

2. The structure of claim 1, and wherein the means to apply said resultant crest voltage to the base of the transistor includes a non-linear resistance adapted to limit the transistor current when it is above a threshold value sufficient to energize said relay.

3. The structure of claim 1, and an adjustable stabilizing device connected in circuit with the relay and the collector and emitter of the transistor and arranged to control the difference between the required shaft velocity to energize the control element and the required shaft velocity to thereafter deenergize the control element.

4. The structure of claim 3, wherein said stabilizing device comprises means to superpose an auxiliary signal on said resultant crest voltage after the beginning of the control action.

5. The structure of claim 3, wherein said stabilizing device comprises means for increasing the voltage generated by said generator after the beginning of the control action and until said control action is completed.

6. A control device as set forth in claim 1, disposed in an engine-driven vehicle having an accelerator to control the amount of fuel to be delivered to the engine, and means mechanically controlled by the accelerator to modify the magnetic circuit of the generator.

7. The structure of claim 1, and a manually controlled variable resistance connected in circuit with the generator to control its output voltage.

8. In combination with the structure of claim 1, a variable resistance connected in circuit with the generator to control its output voltage, and means controlling said variable resistance in accordance with a parameter inherent to the vehicle.

9. The structure of claim 1, and wherein a resistance and a diode are connected in parallel with the Zener diode and in counter-diode relationship thereto.

References Cited in the file of this patent

UNITED STATES PATENTS

| | | |
|---|---|---|
| 2,854,590 | Wolfe | Sept. 30, 1958 |
| 2,947,916 | Beck | Aug. 2, 1960 |